(12) United States Patent
Roberge et al.

(10) Patent No.: US 11,560,852 B2
(45) Date of Patent: *Jan. 24, 2023

(54) FAN DRIVE GEAR SYSTEM

(71) Applicant: Raytheon Technologies Corporation, Farmington, CT (US)

(72) Inventors: Gary D. Roberge, Tolland, CT (US); Michael E. McCune, Colchester, CT (US); William G. Sheridan, Southington, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/484,331

(22) Filed: Sep. 24, 2021

(65) Prior Publication Data
US 2022/0010736 A1    Jan. 13, 2022

Related U.S. Application Data

(63) Continuation of application No. 16/180,548, filed on Nov. 5, 2018, now Pat. No. 11,156,166, which is a (Continued)

(51) Int. Cl.
*F02C 7/36* (2006.01)
*F01D 25/16* (2006.01)

(52) U.S. Cl.
CPC ............... *F02C 7/36* (2013.01); *F01D 25/16* (2013.01); *F05D 2260/40311* (2013.01); *F05D 2260/98* (2013.01)

(58) Field of Classification Search
CPC .......... F02C 7/36; F01D 25/16; F01D 25/162; F05D 2260/403; F05D 2260/40311; F05D 2260/98
(Continued)

(56) References Cited

U.S. PATENT DOCUMENTS 2,154,532 A    4/1939  Ryder
3,861,139 A    1/1975  Jones
(Continued)

FOREIGN PATENT DOCUMENTS

EP    2360391    8/2011
EP    2743462    6/2014
(Continued)

OTHER PUBLICATIONS

Jane's Aero-Engines, Edited by Bill Gunstron, Issue Seven, Mar. 2000. pp. 510-512.
(Continued)

*Primary Examiner* — Woody A Lee, Jr.
*Assistant Examiner* — Justin A Pruitt
(74) *Attorney, Agent, or Firm* — Carlson, Gaskey & Olds, P.C.

(57) ABSTRACT

A gas turbine engine includes a fan section. A speed change mechanism drives the fan section. The speed change mechanism is an epicyclic gear train. A torque frame includes a ring and a plurality of fingers that extend from the ring with the plurality of fingers surrounding the speed change mechanism. A bearing support is attached to the plurality of fingers. A first fan section support bearing is mounted on a first axial side of the speed change mechanism and a second fan section bearing is mounted on a second axial side of the speed change mechanism. The second fan section bearing is a fan thrust bearing.

15 Claims, 4 Drawing Sheets

Related U.S. Application Data continuation of application No. 14/950,326, filed on Nov. 24, 2015, now Pat. No. 10,221,771, which is a continuation-in-part of application No. 14/848,978, filed on Sep. 9, 2015, now abandoned.

(60) Provisional application No. 62/085,924, filed on Dec. 1, 2014, provisional application No. 62/054,506, filed on Sep. 24, 2014.

(58) Field of Classification Search
USPC .................................................. 415/124.1
See application file for complete search history.

(56) References Cited

U.S. PATENT DOCUMENTS

| | | | |
|---|---|---|---|
| 4,983,152 A * | 1/1991 | Kimberlin | F16H 57/082 |
| | | | 475/331 |
| 5,010,729 A | 4/1991 | Adamson | |
| 5,102,379 A | 4/1992 | Pagluica et al. | |
| 5,389,048 A | 2/1995 | Carlson | |
| 5,433,674 A | 7/1995 | Sheridan et al. | |
| 5,466,198 A | 11/1995 | McKibbin et al. | |
| 5,685,797 A | 11/1997 | Barnsby et al. | |
| 6,223,616 B1 | 5/2001 | Sheridan | |
| 6,964,155 B2 | 11/2005 | McCune et al. | |
| 7,011,599 B2 * | 3/2006 | Becquerelle | F16H 57/082 |
| | | | 403/224 |
| 8,191,352 B2 | 6/2012 | Schilling | |
| 8,261,527 B1 | 9/2012 | Stearns et al. | |
| 8,484,942 B1 | 7/2013 | McCune et al. | |
| 8,517,670 B1 * | 8/2013 | Coffin | F02C 7/36 |
| | | | 184/6.12 |
| 8,961,113 B2 * | 2/2015 | Otto | F02C 7/20 |
| | | | 475/331 |
| 9,017,010 B2 * | 4/2015 | Otto | F02C 7/20 |
| | | | 415/1 |
| 10,221,771 B2 * | 3/2019 | Roberge | F01D 25/16 |
| 10,287,914 B2 | 5/2019 | Schwarz et al. | |
| 11,156,166 B2 * | 10/2021 | Roberge | F02C 7/36 |
| 2010/0147998 A1 | 6/2010 | Vetters et al. | |
| 2011/0206498 A1 | 8/2011 | McCooey | |
| 2012/0192570 A1 | 8/2012 | McCune | |
| 2013/0004298 A1 | 1/2013 | Sheridan | |
| 2013/0186058 A1 | 7/2013 | Sheridan et al. | |
| 2013/0195604 A1 * | 8/2013 | Otto | F02C 3/107 |
| | | | 415/124.2 |
| 2014/0087907 A1 | 3/2014 | Coffin | |
| 2014/0271135 A1 | 9/2014 | Sheridan et al. | |

FOREIGN PATENT DOCUMENTS

| | | |
|---|---|---|
| EP | 2915962 | 9/2015 |
| EP | 3000988 | 3/2016 |
| WO | 2014182467 | 11/2014 |

OTHER PUBLICATIONS

Performance and Weight Estimates for an Advanced Open Rotor Engine, Eric S. Hendricks and Michael T. Tong, NASA/TM-2012-217710, AIAA-2012-3911, Sep. 2012, pp. 1-13.

Ciepluch et al., "Quiet, Powered-Lift Propulsion," NASA Conference Publication 2077, Nov. 14-15, 1978 (429 pages).

Civil Turbojet/Turbofan Specifications. Website: http://www.jet-engine.net/civtfspec.html.

Extended European Search Report for European Application No. 15195820.4, dated Feb. 24, 2016.

EP Search Report for EP Application No. 19208573.6 dated Feb. 7, 2020.

* cited by examiner

FAN DRIVE GEAR SYSTEM

CROSS-REFERENCE TO RELATED APPLICATIONS

This application is continuation on U.S. application Ser. No. 16/180,548 filed Nov. 5, 2018, which is a continuation of U.S. application Ser. No. 14/950,326 filed Nov. 24, 2015, now U.S. Pat. No. 10,221,771 granted Mar. 5, 2018, which is a CIP of U.S. application Ser. No. 14/848,978 filed Sep. 9, 2015 which claims priority to U.S. Provisional Application No. 62/054,506 which was filed on Sep. 24, 2014. This application also claims priority to U.S. Provisional Application No. 62/085,924 which was filed on Dec. 1, 2014 through U.S. application Ser. No. 14/950,326.

BACKGROUND

Turbomachines, such as gas turbine engines, typically include a fan section, a turbine section, a compressor section, and a combustor section. Turbomachines may employ a geared architecture connecting the fan section and the turbine section. The compressor section typically includes at least a high-pressure compressor and a low-pressure compressor. The compressors include rotors that rotate separately from a rotor of fan. To maximize performance of such turbomachines, various recent engine architectures have been proposed in which the fan rotates in a first direction and at a first speed as compared to a low pressure compressor which rotates in the opposite direction and at a higher speed. These recent engine architectures can also be improved.

SUMMARY

In one exemplary embodiment, a gas turbine engine includes a fan section and a speed change mechanism for driving the fan section. The speed change mechanism is an epicyclic gear train. A torque frame surrounds the speed change mechanism and includes a plurality of fingers. A bearing support is attached to the plurality of fingers. A first fan section support bearing is mounted forward of the speed change mechanism and a second fan section bearing is mounted on the bearing support aft of the speed change mechanism. The second fan section bearing is a fan thrust bearing.

In a further embodiment of any of the above, the fan thrust bearing engages a gas turbine static structure and the bearing support.

In a further embodiment of any of the above, the bearing support is attached to distal ends of the plurality of fingers.

In a further embodiment of any of the above, the epicyclic gear train is a planetary gear system that includes a sun gear in communication with a fan drive turbine and a planet carrier in communication with the fan section.

In a further embodiment of any of the above, the torque frame includes a first end for engaging the fan section and second end supporting the second fan section bearing.

In a further embodiment of any of the above, each of the plurality of fingers include at least one groove.

In a further embodiment of any of the above, the bearing support includes a plurality of tangs that engage a corresponding one of the at least one groove.

In a further embodiment of any of the above, at least one groove is located on a radially inner side of a corresponding one of the plurality of fingers.

In a further embodiment of any of the above, the speed change mechanism is at least partially axially aligned with a compressor section.

In a further embodiment of any of the above, there is a high pressure compressor with a compression ratio of approximately 20:1 or greater and a fan bypass ratio of approximately 10 or greater.

In a further embodiment of any of the above, there is a low speed spool, an intermediate spool, and a high speed spool.

In another exemplary embodiment, a speed change mechanism for a gas turbine engine includes a planetary gear system. A torque frame surrounds the speed change mechanism. The torque frame includes a plurality of fingers. A bearing support is attached to a downstream end of the plurality of fingers for supporting a fan section support bearing.

In a further embodiment of any of the above, the planetary gear system includes a sun gear that is in communication with a fan drive turbine. A planet carrier is in communication with the fan section.

In a further embodiment of any of the above, the plurality of fingers engage grooves in a planet carrier of the speed change mechanism. The bearing support is attached to a distal end of the plurality of fingers.

In a further embodiment of any of the above, a fan thrust bearing is attached to the bearing support.

In another exemplary embodiment, a method of assembling a gas turbine engine includes supporting a fan section on a first fan section support bearing located forward of a speed change mechanism. The speed change mechanism is a planetary gear system supported by a torque frame that has a plurality of fingers attached to a bearing support. The fan section is supported on a second fan section support bearing attached to the bearing support located aft of the speed change mechanism.

In a further embodiment of any of the above, the torque frame includes a first end for engaging the fan section and a second end attached to a bearing support for supporting the second fan section support bearing.

In a further embodiment of any of the above, the bearing support includes a plurality of tangs that each engages a groove on a corresponding one of the plurality of fingers.

In a further embodiment of any of the above, the gas turbine engine includes a low speed spool, an intermediate spool, and a high speed spool. A low pressure compressor includes at least one compressor stage and no more than five compressor stages.

In a further embodiment of any of the above, a fan section and a low pressure compressor is supported on the first fan section support bearing located forward of the speed change mechanism.

DETAILED DESCRIPTION

Figure 1:
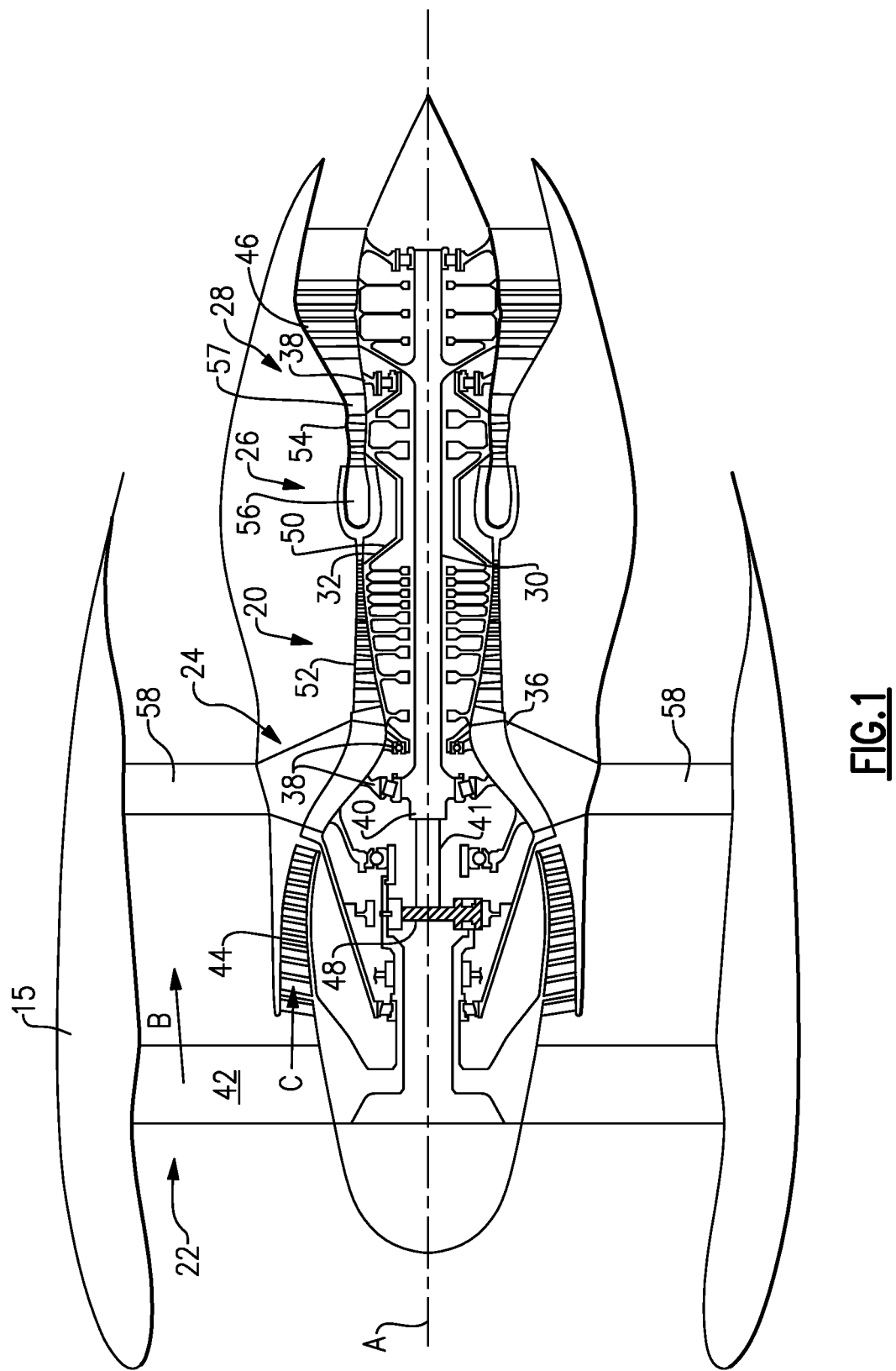
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42 through an input shaft 41, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. The second pressure compressor 52 includes a compression ratio of approximately 20:1 or greater. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

As shown in FIG. 1, the low pressure compressor 44 is axially aligned with the geared architecture 48 so that fan exit guide vanes 58 are located further aft to reduce noise from the gas turbine engine 20.

Figure 2:
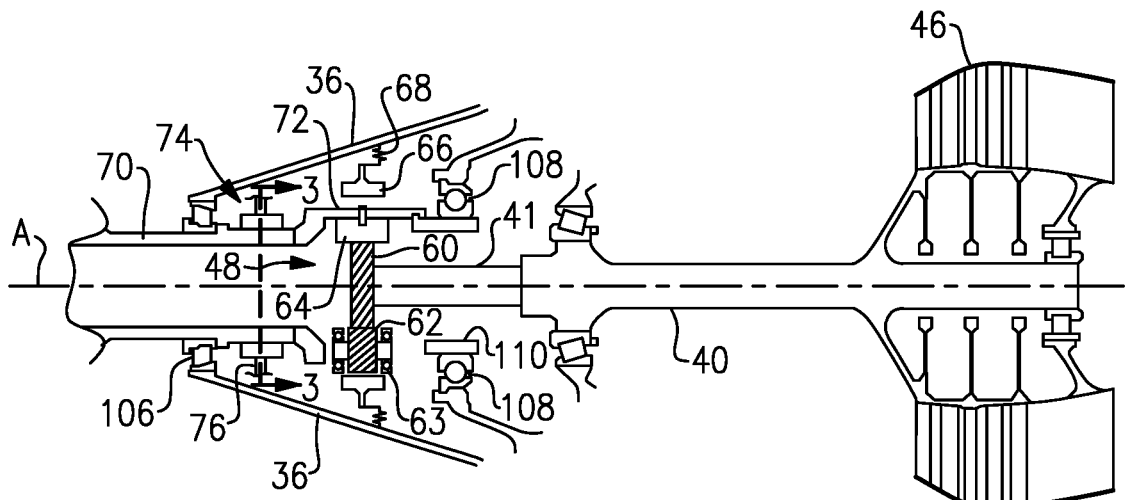
FIG. 2 is an enlarged schematic view of a portion of the example gas turbine engine of FIG. 1.

As shown in FIG. 2, the geared architecture 48 includes a sun gear 60 that is mounted to the input shaft 41 that is attached to the inner shaft 40. Accordingly, the sun gear 60 is driven by the input shaft 41. Surrounding the sun gear 60 is a plurality of planet gears 62 that are supported on bearings 63 by a planet carrier 64. The planet gears 62 are surrounded by a ring gear 66 that is mounted to the engine static structure 36 with a flexible coupling 68 that allows the geared architecture 48 to flex to allow for proper alignment between the various elements of the geared architecture 48 during operation. The planet carrier 64 is attached to a fan drive shaft 70 through a torque frame 72.

Figure 3:
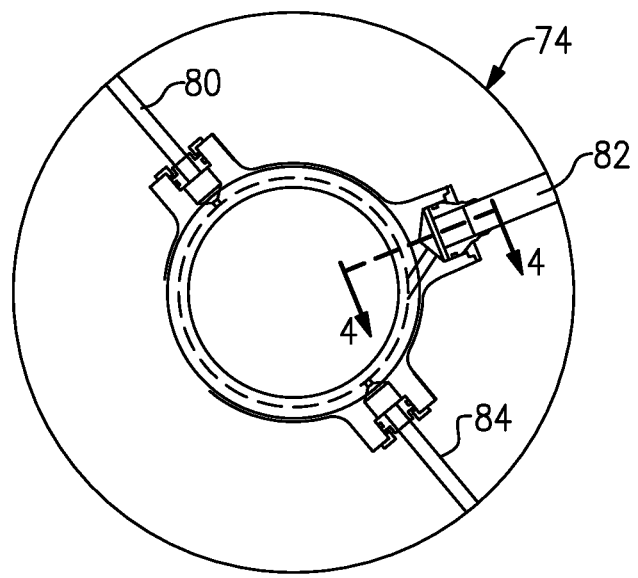
FIG. 3 is a sectional view taken along line 3-3 of FIG. 2.

As shown in FIGS. 2 and 3, an oil transfer bearing 74 directs lubricant from a plurality of stationary oil tubes 76, such as a first stationary oil tube 80, a second station oil tube 82, and a third stationary oil tube 84, into the fan drive shaft 70 and the torque frame 72 to lubricate the geared architecture 48. The oil transfer bearing 74 includes a plurality of inputs to provide lubricant to those portions of the geared architecture 48 that require lubrication during operation. For example, oil from the first stationary oil tube 80 is intended to lubricate at least one of the bearing systems 38, oil from the second stationary oil tube 82 is intended to lubricate the bearings 63 in the geared architecture 48, and oil from the third stationary oil tube 84 is intended to lubricate the sun gear 60, planet gears 62, and the ring gear 66 of the geared architecture 48. Though three oil tube inputs are shown herein, other numbers of oil tubes are contemplated herein.

Figure 4:
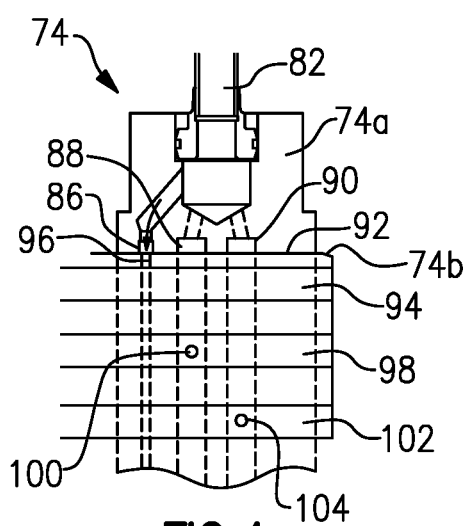
FIG. 4 is a sectional view taken along line 4-4 of FIG. 3.

FIG. 4 illustrates a sectional view of the oil transfer bearing 74. In the illustrated example, the oil transfer bearing 74 includes a first race 86, a second race 88, and a third race 90 each having a rectangular shape that extend around an interior surface 92 of a stationary bearing 74a.

A first oil conduit 94 extends axially through the fan drive shaft 70 and is in communication with the first race 86 via a first opening 96. A second oil conduit 98 extends axially through the fan drive shaft 70 and is in communication with the second race 88 via a second opening 100. A third oil conduit 102 extends axially through the fan drive shaft 70 and is in communication with the third race 90 via a third opening 104.

As the fan drive shaft 70 and the rotating bearing 74b rotate within the stationary bearing 74a, the first, second, and third openings 96, 100, 104 are constantly in alignment with the first, second, and third races 86, 88, 90, respectively. This allows oil to flow across a rotating gap between the stationary bearing 74a and the rotating bearing 74b through the first, second, and third openings 96, 100, 104 to the first, second, and third oil conduits 94, 98, 102, respectively, to provide lubrication to the necessary areas in the gas turbine engine 20.

As shown in FIG. 2, the geared architecture 48 is located axially between a fan roller bearing 106 and a fan thrust bearing 108. The fan roller bearing 106 engages the fan drive shaft 70 and the static structure 36. The fan thrust bearing 108 engages the static structure 36 and a support ring 110 attached to the torque frame 72.

Figure 5:
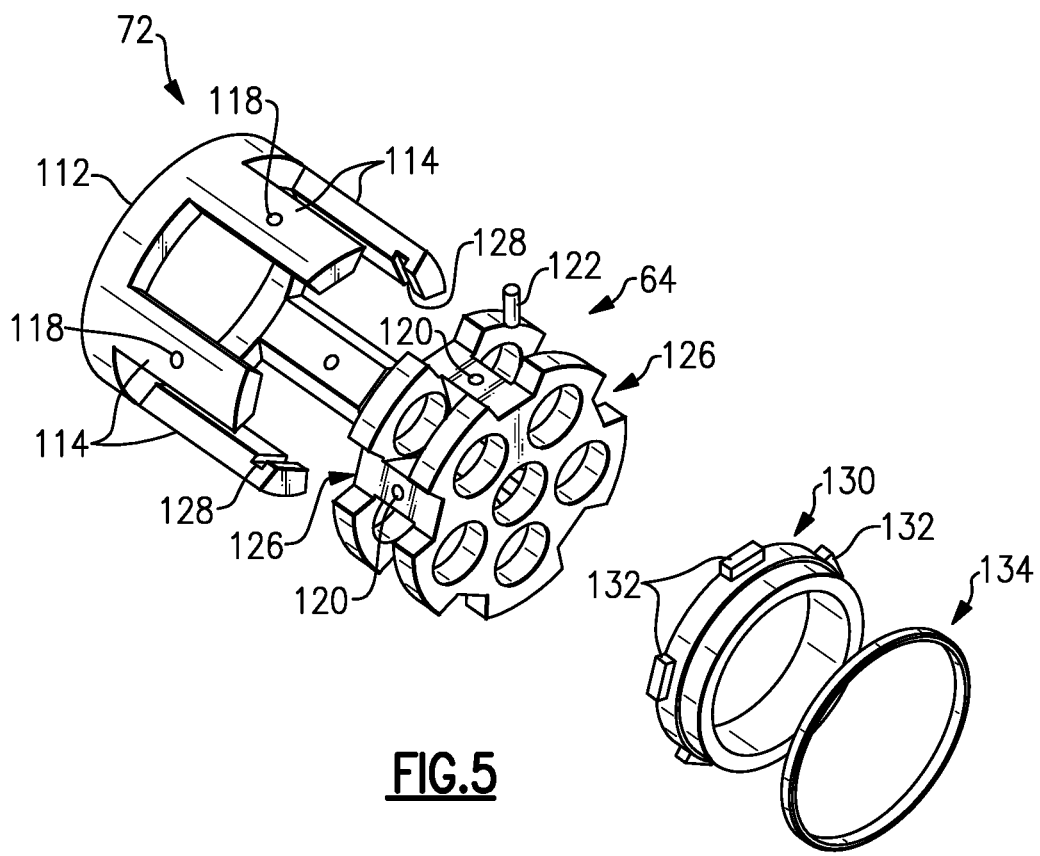
FIG. 5 is a perspective view of a portion of a speed change mechanism.

As shown in FIG. 5, the torque frame 72 includes a base ring 112 that attaches to the fan drive shaft 70 on a first axial side and a plurality of fingers 114 that extend from a second axial side of the base ring 112. The plurality of fingers 114 slideably engage corresponding grooves 126 in the planet carrier 64. At least one torque frame pin opening 118 extends through each of the plurality of fingers 114 and aligns with at least one carrier pin opening 120 in the planet carrier 64 to accept a pin 122 that will pass through the at least one torque frame pin openings 118 and into that at least one carrier pin openings 120 to lock the torque frame 72 from moving axially relative to the planet carrier 64.

As shown in FIG. 2, the plurality of fingers 114 extend beyond an axial downstream side of the planet carrier 64. In the illustrated example, the axial downstream ends of the plurality of fingers 114 include locking slots 128 on radially inner sides of each of the plurality of fingers 114 to engage a support ring 130. The locking slots 128 extend between opposing sides of each of the plurality of fingers 114.

The support ring 130 includes a plurality of tangs 132 extending outward from a radially outer side of the support ring 130. The plurality of tangs 132 are circumferentially spaced around an outer perimeter of the support ring 130 to align with the locking slots 128 of each of the plurality of fingers 114.

In order to attach the support ring 130 to the torque frame 72, the grooves 126 on the planet carrier 64 are circumferentially aligned with the plurality of fingers 114. Then the planet carrier 64 is moved axially toward the torque frame 72 until the torque frame pin openings 118 align with the carrier pin openings 120. The pins 122 then extend through the torque frame pin openings 118 and the carrier pin openings 120 to lock the planet carrier 64 relative to the torque frame 72 from relative axial movement. The plurality of fingers 114 engaging the grooves 126 prevents the torque frame 72 from rotating relative to the planet carrier 64 and allows torque to be transferred from the planet carrier 64 into the torque frame 72 and then through the fan drive shaft 70.

Once the planet carrier 64 is secured relative to the torque frame 72, the support ring 130 is aligned so that the plurality of tangs 132 are circumferentially aligned with open areas circumferentially located between the plurality of fingers 114. The support ring 130 then moves axially towards the torque frame 72 until the plurality of tangs 132 are axially aligned with the locking slots 128. The locking ring 130 is then rotated either clockwise or counterclockwise until the plurality of tangs 132 are aligned with the plurality of fingers 114 and located within the locking slots 128. A lock nut 134 is treaded onto a threaded portion of the support ring 130 to prevent the support ring 130 from rotating relative to the torque frame 72.

Once the support ring 130 has been secured to the torque frame 72, the support ring 130 will then support a radially inner side of the fan thrust bearing 108. This allows for a compact packaging of the geared architecture 48 that can reduce the overall length of the gas turbine engine 20 and allow the geared architecture to be straddled by both the fan roller bearing 106 and the fan thrust bearing 108.

Figure 6:
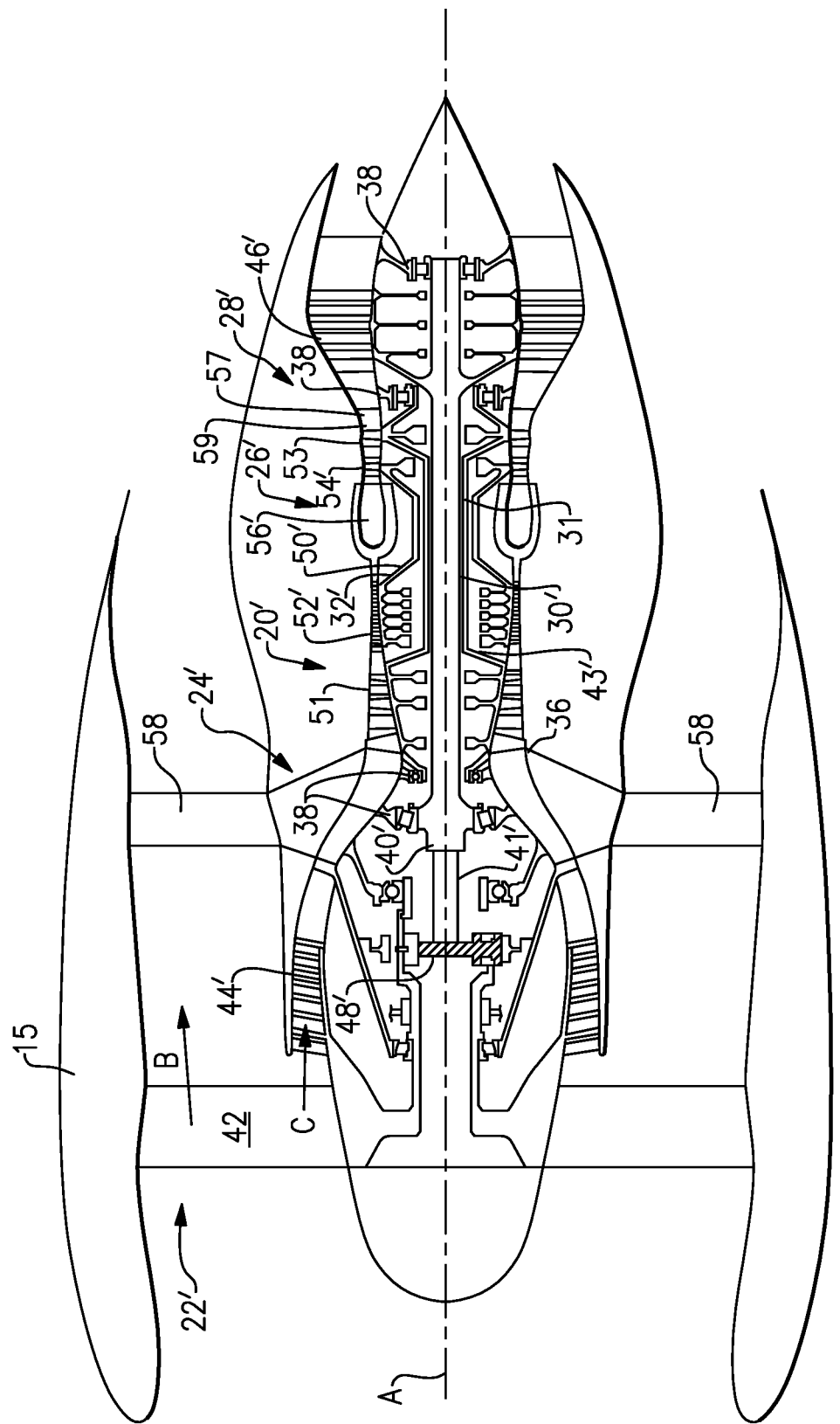
FIG. 6 is a schematic view of another example gas turbine engine.

FIG. 6 illustrates another example gas turbine engine 20'. The example gas turbine engine 20' is similar to the gas turbine engine 20 except where described below or shown in the Figures. The gas turbine engine 20' is disclosed herein as a three-spool turbofan that generally incorporates a fan section 22', a compressor section 24', a combustor section 26', and a turbine section 28'.

The exemplary engine 20' generally includes a low speed spool 30', an intermediate spool 31, and a high speed spool 32' mounted for rotation about an engine central longitudinal axis A relative to an engine static structure 36 via several bearing systems 38.

The low speed spool 30' generally includes an inner shaft 40' that interconnects a fan 42 through an input shaft 41', a first (or low) pressure compressor 44' and a first (or low) pressure turbine 46'. The inner shaft 40' is connected to the fan 42 through a speed change mechanism, which in the exemplary gas turbine engine 20' is illustrated as a geared architecture 48' to drive the fan 42 at a lower speed than the low speed spool 30'. In one example, the low pressure compressor 44' includes at least one compressor stage and no more than five compressor stages. In another example, the low pressure compressor 44' includes at least two compressor stages and no more than four compressor stages.

The intermediate spool 31' includes an intermediate shaft 43 that interconnects a third (or intermediate) pressure compressor 51 with a third (or intermediate) pressure turbine 53.

The core airflow is compressed by the low pressure compressor 44', the intermediate pressure compressor 51, and the high pressure compressor 52', mixed and burned with fuel in the combustor 56', then expanded over the high pressure turbine 54', the intermediate pressure turbine 53, and low pressure turbine 46'. The mid-turbine frame 57 includes airfoils 59 which are in the core airflow path C. The turbines 46', 53, and 54' rotationally drive the respective low speed spool 30', intermediate spool 31, and the high speed spool 32' in response to the expansion. It will be appreciated that each of the positions of the fan section 22', compressor section 24', combustor section 26', turbine section 28', and geared architecture 48' may be varied. For example, the geared architecture 48 may be located aft of combustor section 26' or even aft of turbine section 28', and fan section 22' may be positioned forward or aft of the location of the geared architecture 48'.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A gas turbine engine comprising:
   a fan section;
   a speed change mechanism for driving the fan section, wherein the speed change mechanism is an epicyclic gear train;
   a torque frame including a ring and a plurality of fingers extending from the ring with the plurality of fingers surrounding the speed change mechanism;
   a bearing support attached to the plurality of fingers; and
   a first fan section support bearing mounted on a first axial side of the speed change mechanism and a second fan section support bearing mounted on the bearing support on a second axial side of the speed change mechanism, wherein the second fan section support bearing is a fan thrust bearing;
   wherein each of the plurality of fingers include at least one groove and the bearing support includes a plurality of tangs that engage a corresponding one of the at least one groove.

2. The gas turbine engine of claim 1, wherein the fan thrust bearing engages a gas turbine static structure on a radially outer side and the bearing support a radially inner side with the radially outer side and the radially inner side relative to a central longitudinal axis of the gas turbine engine.

3. The gas turbine engine of claim 2, wherein the bearing support is attached to distal ends of the plurality of fingers.

4. The gas turbine engine of claim 3, wherein the epicyclic gear train is a planetary gear system including a sun gear in communication with a fan drive turbine and a planet carrier in communication with the fan section and the bearing support is attached to distal ends of the plurality of fingers and is axially spaced from the planet carrier.

5. The gas turbine engine of claim 4, wherein the torque frame includes a first end for engaging the fan section and second end supporting the second fan section support bearing.

6. The gas turbine engine of claim 5, wherein the at least one groove is located on a radially inner side of a corresponding one of the plurality of fingers.

7. The gas turbine engine of claim 1, wherein the speed change mechanism is at least partially axially aligned with a compressor section and distal ends of the plurality of fingers are spaced from a planet carrier of the epicyclic gear train.

8. The gas turbine engine of claim 1, further comprising a high pressure compressor with a compression ratio of approximately 20:1 or greater and a fan bypass ratio of approximately 10 or greater.

9. A speed change mechanism for a gas turbine engine comprising:
   a planetary gear system including a planet carrier supporting a plurality of planet gears;
   a torque frame including a ring and a plurality of fingers extending from the ring and surrounding the speed change mechanism; and
   a bearing support attached to distal ends of the plurality of fingers for supporting a fan section support bearing;
   wherein the plurality of fingers engage grooves in the planet carrier of the speed change mechanism, a distal end of each of the plurality of fingers includes a radially inward facing groove for accepting a tang on the bearing support and the bearing support forms a ring.

10. The mechanism of claim 9, wherein the planetary gear system includes a sun gear in communication with a fan drive turbine and the planet carrier is in communication with the fan section and the plurality of fingers engage grooves in a radially outermost surface of the planet carrier of the speed change mechanism.

11. The mechanism of claim 9, further comprising a fan thrust bearing having a radially inner side attached to the bearing support and configured to rotate at the same speed and in the same direction as the bearing support.

12. A method of assembling a gas turbine engine comprising:
   supporting a fan section on a first fan section support bearing located on a first axial side of a speed change mechanism wherein the speed change mechanism is a planetary gear system supported by a torque frame having a ring and a plurality of fingers extending from the ring and distal ends of the plurality of fingers are attached to a bearing support;
   supporting the fan section on a second fan section support bearing attached to the bearing support located on a second axial side of the speed change mechanism; and
   supporting the fan section and a low pressure compressor on the first fan section support bearing, wherein the planetary gear system includes a planet carrier and the bearing support is axially spaced from the planet carrier and is rotatable relative to the plurality of fingers and the planet carrier.

13. The method of claim 12, wherein the torque frame includes a first end for engaging the fan section and a second end attached to the bearing support for supporting the second fan section support bearing.

14. The method of claim 13, wherein the bearing support includes a plurality of tangs that each engages a groove on a corresponding one of the plurality of fingers.

15. The method of claim 14, wherein the gas turbine engine includes a low speed spool, an intermediate spool, and a high speed spool and a low pressure compressor including at least one compressor stage and no more than five compressor stages.

* * * * *